United States Patent [19]

Saar et al.

[11] 4,317,176
[45] Feb. 23, 1982

[54] MICROCOMPUTER CONTROLLED POWER TOOL

[75] Inventors: David A. Saar, Timonium; Robert Bradus, Randallstown, both of Md.

[73] Assignee: Black & Decker Inc., Newark, Del.

[21] Appl. No.: 133,464

[22] Filed: Mar. 24, 1980

[51] Int. Cl.³ .................. G06F 15/46; H02P 7/28
[52] U.S. Cl. ..................... 364/474; 318/245; 318/305; 318/332; 318/334; 318/434
[58] Field of Search ........... 364/474; 318/245, 272, 318/278, 305, 332, 334, 432, 434; 408/8, 9, 10

[56] References Cited

U.S. PATENT DOCUMENTS

| | | | |
|---|---|---|---|
| 3,829,750 | 8/1974 | Centner et al. | 364/474 X |
| 3,834,615 | 9/1974 | Watanabe et al. | 364/474 X |
| 3,978,385 | 8/1976 | Stroezel | 318/337 |
| 4,007,492 | 2/1977 | Rose | 360/75 |
| 4,066,942 | 1/1978 | Bardwell et al. | 318/434 |
| 4,071,980 | 2/1978 | Kubo | 51/165.87 |
| 4,076,442 | 2/1978 | Cox, Jr. et al. | 408/8 |
| 4,090,116 | 5/1978 | Lippitt | 318/345 E |
| 4,134,038 | 1/1979 | Kosak et al. | 318/245 |
| 4,157,491 | 6/1979 | Werner et al. | 318/798 |
| 4,158,796 | 6/1979 | Kosak et al. | 318/245 |
| 4,182,979 | 1/1980 | Douglas et al. | 318/332 X |
| 4,199,814 | 4/1980 | Rapp et al. | 364/474 |
| 4,230,977 | 10/1980 | Nelson | 318/305 |

FOREIGN PATENT DOCUMENTS

| | | | |
|---|---|---|---|
| 1271431 | 4/1972 | United Kingdom | 318/337 |
| 1272626 | 5/1972 | United Kingdom | 318/337 |
| 1356858 | 6/1974 | United Kingdom | 318/337 |

Primary Examiner—Jerry Smith
Attorney, Agent, or Firm—Harold Weinstein; Edward D. Murphy; Walter Ottesen

[57] ABSTRACT

A microcomputer controlled power tool including a semiconductor control device connected to the motor, one or more sensors, and a microcomputer interfaced to a keyboard and digital display for monitoring and controlling various operating conditions and parameters of the power tool.

5 Claims, 10 Drawing Figures

MICROCOMPUTER CONTROLLED POWER TOOL

BACKGROUND AND SUMMARY OF THE DISCLOSURE

The present invention relates to power tools and in particular to a power tool having a microcomputer-based control circuit for monitoring and controlling various operating conditions and parameters.

Conventional power tools typically provide a few rudimentary mechanical controls for controlling the operation of the tool. In addition, very little information concerning the operating condition of the tool is generally communicated back to the operator.

Accordingly, it is the primary object of the present invention to provide a power tool that includes a microcomputer-based control circuit that is adapted to control various operating functions and continuously monitor certain critical operating parameters. In general, the control circuit is comprised of a microcomputer, a power semiconductor control device for controlling power to the motor, and one or more sensors for monitoring various parameters and providing feedback information in the microcomputer.

In the preferred embodiment, which describes the present invention in the environment of a drill press, the speed signal information derived from a speed sensor device operatively coupled to the motor is used by the microcomputer to control the speed of the motor, prevent motor kickback caused by a binding tool bit, detect a stall condition, and provide overload protection for the motor. In addition, the microcomputer in the preferred embodiment is programmed to gradually "ramp" the speed of the motor to the desired speed on start-up and when a faster speed setting is selected. The microcomputer is interfaced to input means, such as a keyboard, via which speed selections are entered by the operator. The microcomputer is programmed to control the speed of the motor by controlling the conduction angle of the power semiconductor control device in accordance with the desired speed value entered on the keyboard. In the event the speed of the motor is slowed through increased loading of the tool bit, the microcomputer is programmed to automatically respond by increasing the conduction angle of the semiconductor control device until the actual speed of the motor as measured by the speed sensor equals the desired speed value, or the maximum output of the motor is reached.

The microcomputer also utilizes the speed signal information from the speed sensor to provide anti-kickback protection for the drill press. More particularly, the microcomputer is programmed to recognize when the rotational speed of the motor is decelerating and to detect when the rate of deceleration exceeds a predetermined rate. In response to the detection of such an occurrence, the microcomputer will automatically cut power to the motor. In addition, if the motor is restarted and the tool bit does not break free within a prescribed time period, the microcomputer is further programmed to detect the stall condition and again remove power to the motor. More generally, whenever a lack of spindle movement is detected over a prescribed period of time, the microcomputer is programmed to recognize the condition as a stall and interrupt power to the motor.

A sophisticated form of overload protection is also provided which warns of an impending overload condition, using solely the speed signal information derived from the speed sensor and the known conduction angle of the semiconductor control device. Accordingly, an incremental cost savings is realized. The overload calculation utilizes a numerical integrator, which in the preferred embodiment comprises a storage register whose contents are periodically updated by adding to or subtracting from the current value a "heating value" which is determined according to the conduction angle (voltage) and measured speed of the motor. The "heating values" assigned to each of the various operating ranges of the motor are empirically determined and stored in matrix form in the microcomputer. Positive "heating values" correspond to a net heat increase and negative values correspond to a net heat loss. Whenever the accumulated total in the storage register exceeds a predetermined value, an overload condition is signalled. The signal is removed when the total drops below a second lower predetermined value.

The preferred embodiment of the microcomputer-based control circuit of the present invention also includes a position encoder device for providing position information to the microcomputer concerning the vertical position of the tool bit relative to a preselected reference position. The position encoder is operatively coupled to the depth adjustment mechanism of a drill press so that its output signal varies in accordance with vertical movement of the housing assembly. The microcomputer is programmed to calculate the vertical position of the tool bit relative to a reference position and display the result on a digital display. The reference position is selected by depressing the "SET DEPTH" button on the keyboard which zeroes the display.

The digital display can also be utilized by the operator to display the rotational speed of the tool bit by depressing the appropriate display function key on the keyboard. In addition, various warnings and error codes are automatically displayed on the display to warn the operator of a problem or inform the operator of the cause for a shutdown.

Additional objects and advantages of the present invention will become apparent from a reading of the detailed description of the preferred embodiment which makes reference to the following set of drawings in which:

BRIEF DESCRIPTION OF THE DRAWINGS

FIG. 2a is a side elevational view of the drill press of FIG. 1 partially cutaway to show the height adjustment mechanism of the drill press;

FIG. 2b is a sectional view of the drill press taken along line b—b in FIG. 2a;

DETAILED DESCRIPTION OF THE PREFERRED EMBODIMENT

Figure 1:
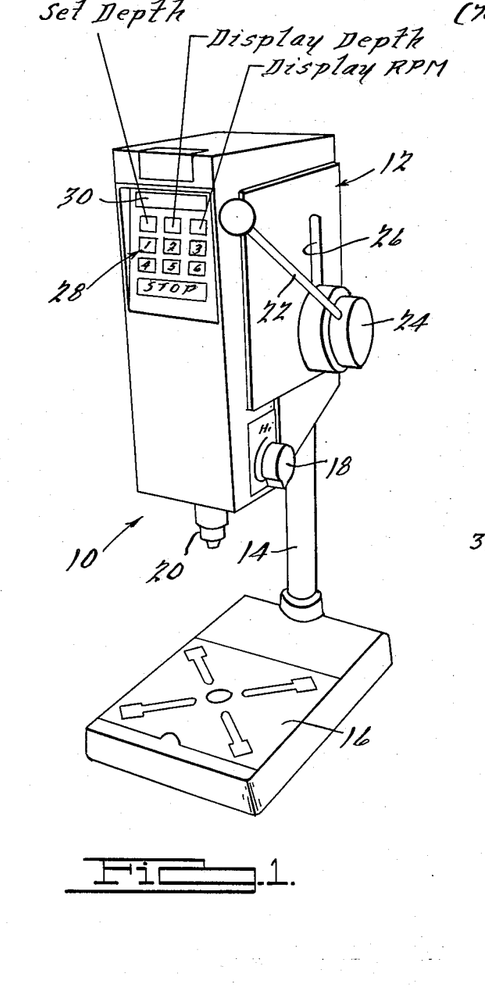
FIG. 1 is a perspective view of a microcomputer controlled drill press according to the present invention.

Referring to FIG. 1, a perspective view of a microcomputer controlled drill press 10 according to the present invention is shown. Although the preferred embodiment describes the present invention embodied in a drill press, it is to be understood that the teachings of the present invention are equally applicable to other types of power tools. The drill press 10 comprises a housing assembly 12 that is secured to a column 14 which is vertically supported by a base 16. The base 16 also serves as a table for supporting the workpiece. The housing assembly 12 contains an electric motor that is drivingly coupled through a two-speed gear assembly to an output spindle which has fastened to its exposed end a chuck 20 for receiving a tool bit (not shown). Mechanical gear selection is made via a rotary knob 18 located on the side of the housing. A control arm 22 is connected to a cross shaft 24 which extends through a vertical slot 26 in the side of the housing 12. Arcuate movement of the control arm 22 is effective to cause the entire housing assembly 12 to move vertically relative to column 14 so that a tool bit secured in chuck 20 can be lowered into operative contact with a workpiece located on base 16.

Disposed on the front face of the housing assembly 12 is a keyboard 28, which in the preferred embodiment comprises ten pushbutton switches. Located above the keyboard 28 is a 6-digit digital display 30. Six of the pushbutton switches on the keyboard 28 are numerical switches designated "1-6" and are utilized in the preferred embodiment for selecting one of six different armature speeds. Two of the remaining four pushbutton switches are display function keys and are utilized for selecting the information to be displayed on the digital display 30. In particular, one of the display function keys is used for displaying the spindle speed and the other display function key is used for displaying the linear position of the tool bit, or what is more commonly referred to as the depth of cut. The remaining two pushbutton switches on the keyboard 28 are a STOP button and a "SET DEPTH" button. Depression of the STOP button is effective to interrupt power to the motor to halt further rotation of the spindle 18. The "SET DEPTH" button is provided for zeroing the digital display when in the linear position display mode. Thus, to provide a read-out of the depth of cut of the tool bit, the operator will initially zero the display 30 with the tip of the tool bit in contact with the surface of the workpiece. Thereafter, the linear position read-out provided on the display 30 will correspond to the vertical position of the tool bit relative to the "zero" position established.

Figures 2A, 2B:
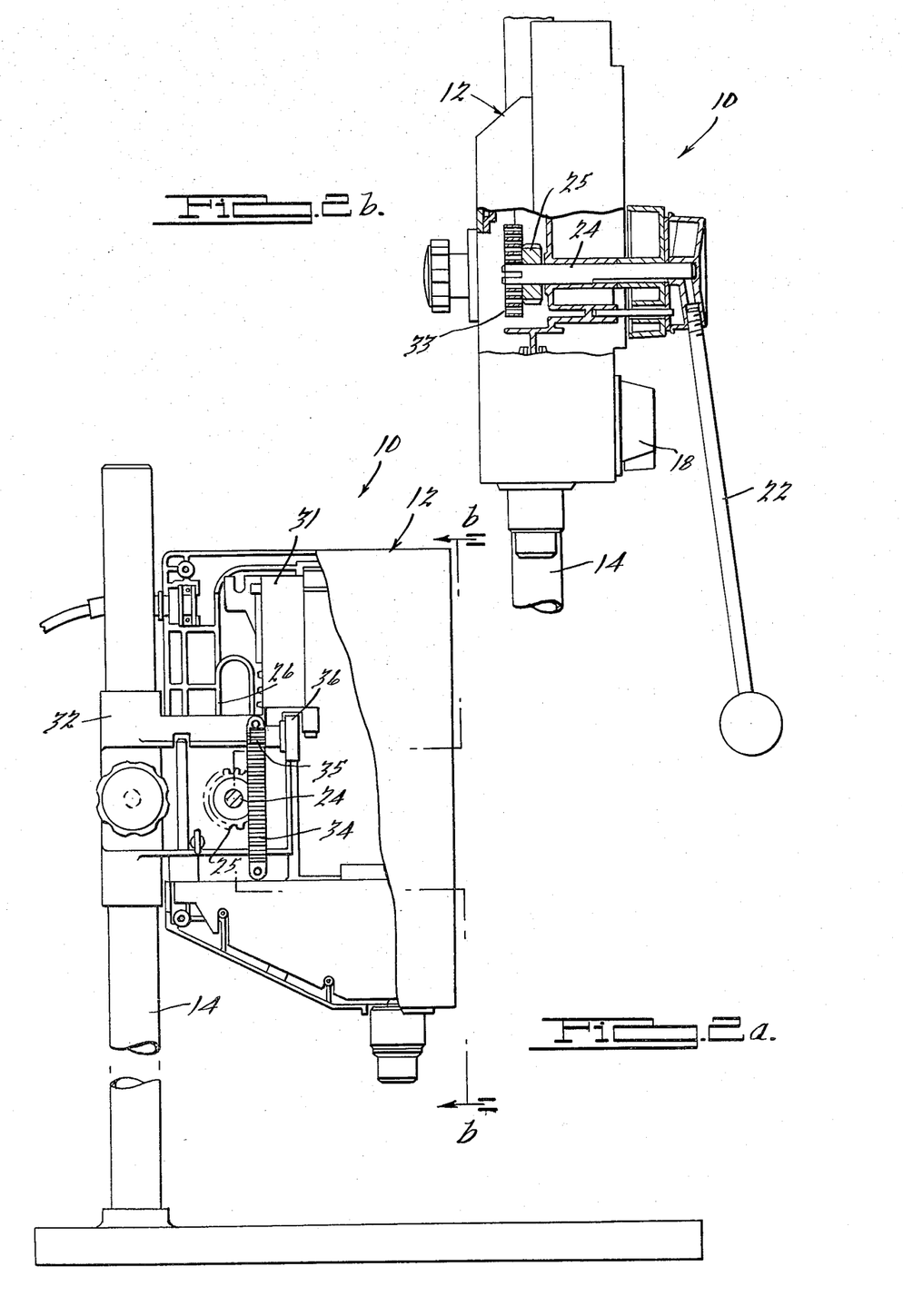

As best shown in FIGS. 2a and 2b, the cross shaft 24 is internally keyed to a pinion gear 25 which engages a rack 31 that is affixed to the inside of the housing assembly 12. Also disposed on the end of shaft 24 is a spiral spring 33 which serves to bias the housing assembly 12 away from base 16. The rack 31 has fastened thereto a position encoder switch 36 having a pinion shaft 35 that engages an encoder rack 34. The encoder rack 34 is secured to a bracket 32 which supports cross shaft 24 and thus maintains pinion gear 25 and encoder rack 34 stationary relative to column 14. Rotation of pinion gear 25, therefore, via control arm 22, will cause rack 31, and hence position encoder switch 36 and the entire housing assembly 12, to move vertically. Vertical movement of the position encoder switch 36 relative to the encoder rack 34 will in turn cause the encoder pinion 35 to rotate and change the output state of the position encoder switch 36.

The position encoder utilized in the preferred embodiment comprises a 52-position two-channel encoder switch 36. The 52-position switch is adapted to produce a two-channel digital output signal that sequences through a predefined Gray code as the encoder pinion 35 is rotated by vertical movement of the switch 36 along encoder rack 34. Specifically, the two output lines from the 52-position switch 36 will vary during a single revolution of the encoder pinion 35 according to the following table:

| POSITION | OUTPUTS | |
|---|---|---|
| | A | B |
| 1 | 0 | 0 |
| 2 | 1 | 0 |
| 3 | 1 | 1 |
| 4 | 0 | 1 |
| 5 | 0 | 0 |
| * | * | * |
| * | * | * |
| * | * | * |
| 48 | 0 | 1 |
| 49 | 0 | 0 |
| 50 | 1 | 0 |
| 51 | 1 | 1 |
| 52 | 0 | 1 |

The term "Gray code" refers to the fact that the state of only one bit changes from one position to the next. The advantage of using a Gray code for this application is that it provides a convenient means for readily determining the direction of rotation of the encoder pinion 35 and hence the direction of vertical movement of the housing assembly 12. In particular, if both bits are initially equal and the "A" bit changes, then the switch position is incrementing, whereas if the "B" bit changes the switch position is decrementing. Similarly, if both bits are initially unequal and the "A" bit changes, the switch position is decrementing, whereas if the "B" bit changes the switch position is incrementing.

Figure 3:
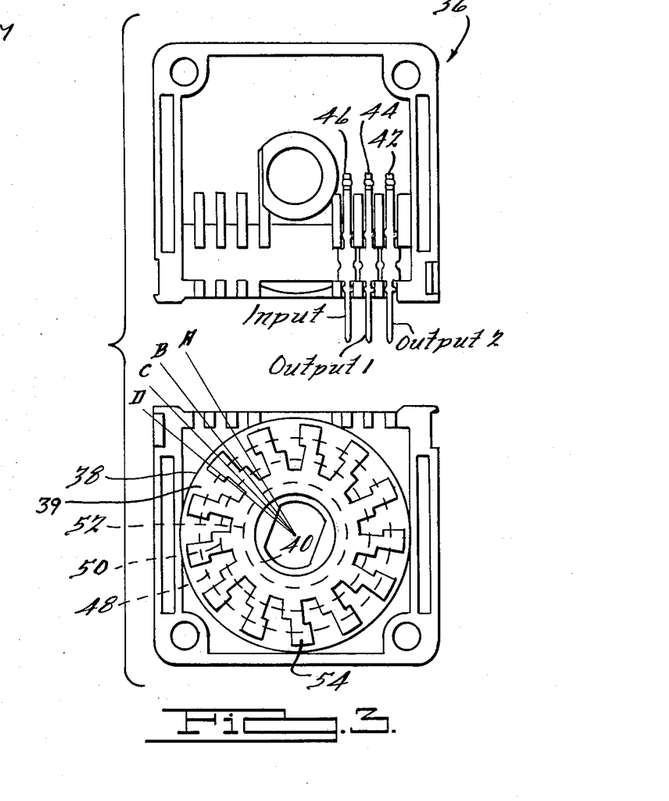
FIG. 3 is a disassembled view of the position encoder switch utilized in the preferred embodiment herein.

With particular reference to FIG. 3, a disassembled view of the 52-position encoder switch 36 utilized in the preferred embodiment is shown. The switch 36 is principally comprised of a disc 38 keyed to the encoder pinion shaft 35 and three contact terminals 42-46 which are adapted to trace three concentric circular paths, designated 48-52 respectively, on the disc 38 as it is rotated. Contact terminal 46 is an input terminal and contact terminals 42 and 44 are the two output terminals of the switch 36. The disc 38 consists of a non-conductive material 39 having disposed thereon a layer of conductive material 40. The pattern of conductive material 40 is arranged so that the input terminal 46 is in continuous contact with the conductive layer 40 while the two output terminals 42 and 44 are periodically in contact with conductive layer 40 as their paths pass over the thirteen radially extending segments 54 of the pattern. Each of the thirteen segments 54 is configured so that in a first radial position (A) neither output terminal 42 or 44 contacts conductive layer 40, in a second radial position (B) only output terminal 44 contacts conductive layer 40, in a third radial position (C) both output terminals 42 and 44 contact conductive layer 40, and in a fourth radial position (D) only output terminal 42 contacts conductive layer 40. Thus, power from input terminal 46 is provided to neither output terminal 42 or 44 in radial position (A), to only output terminal 44 in radial position (B), to both output terminals 42 and 44 in radial position (C), and to only output terminal 42 in radial position (D). This pattern is repeated, of course, for each of the thirteen segments 54, thus providing the 52 switch positions. It will be appreciated, however, that this is but one type of two-phase position encoder and that other types of position encoding devices may be used.

Figure 4:
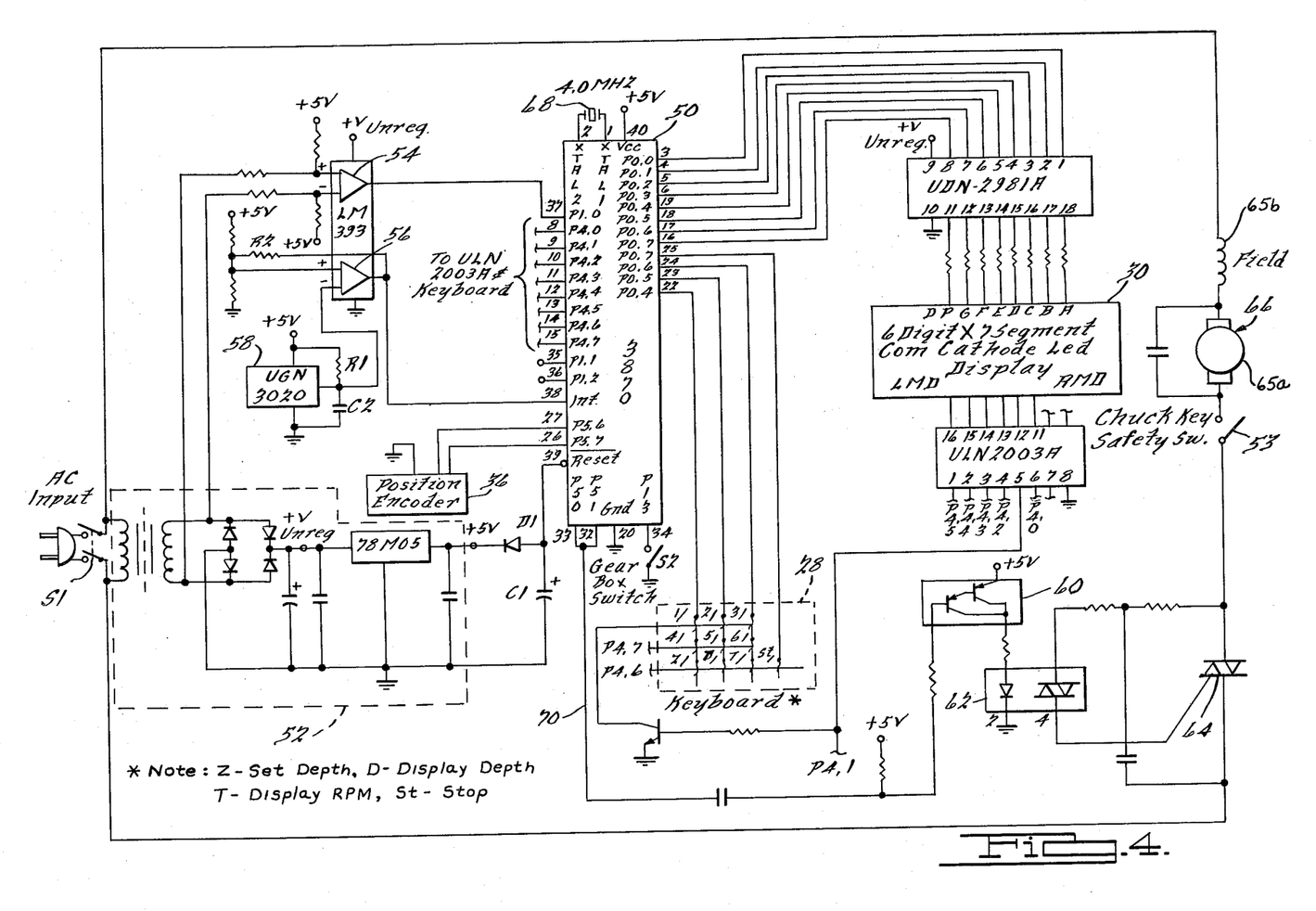
FIG. 4 is a circuit diagram of the microcomputer-based control circuit of the present invention.

Referring now to FIG. 4, a circuit diagram of the electronic control circuit of the present invention is shown. The control circuit is principally comprised of a microcomputer 50 which in the preferred embodiment is a MC 3870P single chip, N-channel microcomputer manufactured by Motorola Corp. Although the preferred embodiment described herein discloses a microcomputer implementation, it is to be understood that the teachings of the present invention may also be implemented utilizing other forms of digital circuitry, such as discrete digital logic integrated circuits.

The microcomputer 50 receives power through a power supply circuit 52, which converts the 115 volt a.c. input signal to a +5 volt d.c. signal, and is clocked by a 4 MHz crystal or ceramic resonator 68. Upon start-up, capacitor C1 provides a reset pulse of a predetermined duration to the $\overline{\text{RESET}}$ input terminal of the microcomputer 50 to initialize the microcomputer. Diode D1 provides a rapid discharge path for capacitor C1 when the unit is shut off to insure that a reset pulse of proper duration is produced upon subsequent start-up.

The output from the position encoder 36 is provided to the No. 5 I/O port of the microcomputer 50. As previously noted, the two-channel output from the position encoder 36 provides the microcomputer 50 with feedback information concerning the vertical position of the tool bit relative to a selected reference position. More particularly, by counting the number of changes in the output state of the 52-position switch 36 and discerning the direction of movement according to the analysis described above, the microcomputer can readily calculate the total amount of movement of the tool bit relative to the preselected reference position. In the preferred embodiment, one revolution of the encoder pinion 35 corresponds to a displacement of 1.04 inches at the chuck 20. Accordingly, to provide a readout of the vertical displacement of the tool bit, the microcomputer 50 simply multiplies the total switch count by a factor of (1.04/52) or 0.02.

Thus, it will be appreciated that in order to drill a hole to a given depth, for example, the operator will initially lower the drill bit until it contacts the surface of the workpiece, press the "SET DEPTH" button on the keyboard 28 to reference the digital display 30, and then proceed to drill the hole into the workpiece until the desired cutting depth appears on the display 30.

Speed information is supplied to the microcomputer 50 via a speed sensor 58 which is operatively connected to the armature 65a of the motor 66. In the preferred embodiment, a Hall-effect type speed sensor is utilized, although other suitable sensor devices can readily be substituted. The Hall sensor is located in proximity to the path of a permanent magnet which is affixed to the motor armature 65a. The speed sensor 58 is adapted to produce one output pulse for each revolution of the motor armature 65a. The square wave pulse signal from the output of the speed sensor 58 is filtered by capacitor C2 and resistor R1 and provided to the external interrupt terminal (INT) of the microcomputer 50 through a comparator amplifier 56 which adds hysteresis to the signal due to the presence of resistor R2. By counting the number of pulses received from the speed sensor 58 within a specified time period, the microcomputer 50 is programmed to determine the rotational speed of the chuck 20 for display on the digital display 30. Additionally, it should be noted that the state of a gear box switch S2 (FIG. 4), which is operatively coupled to the mechanical two-speed gear assembly, is also interrogated by the microcomputer 50 when calculating chuck speed for display purposes. The microcomputer accounts for a change in gear selection by proportionately altering the time base for the calculation.

In addition to utilizing the speed signal information from the speed sensor 58 for display purposes, the speed sensor 58 is also used to provide the microcomputer 50 with feedback information for controlling the speed of the motor 66. However, in view of the response time considerations associated with closed-loop speed control, the microcomputer 50 is also programmed to calculate the speed of the motor by measuring the elapsed time between the receipt of successive speed pulses from the speed sensor 58. In this manner, substantially less time is required for the microcomputer 50 to calculate a speed value.

In the preferred embodiment, the rotational speed of the motor 66 is controlled by phase control of the a.c. input signal via a TRIAC 64 that is connected in series with the motor 66. The firing angle of the TRIAC 64 is in turn controlled by the signal produced on line 70 from I/O port 5 of the microcomputer 50. The control signal on line 70 is provided to the gate of the TRIAC 64 through an optical coupler 62, which is driven by a Darlington driver 60. When the microcomputer 50 produces a firing signal on line 70, the Darlington driver 60 is rendered conductive, thereby energizing the optical coupler 62 and firing the TRIAC 64. As will readily be appreciated by those skilled in the art, controlling the firing angle of TRIAC 64 controls the amount of voltage supplied to the motor 66 which in turn determines the speed of the motor 66.

In order to synchronize the microcomputer 50 with the a.c. line voltage, a zero-crossing detector circuit, comprised of comparator amplifier 54, is provided which produces an output signal that is provided to I/O port 1 of the microcomputer 50 to indicate each time the line voltage crosses zero. In this manner, the microcomputer 50 can accurately control the firing angle of the TRIAC 64 relative to the zero-crossing point of the a.c. supply voltage waveform.

As set forth in the flow chart diagrams illustrated in FIGS. 6a–6d, when a speed selection is made by depressing one of the six speed select keys on the keyboard 28, the desired speed value is determined by the microcomputer 50. Thereupon, the microcomputer 50 begins to gradually advance the firing angle of the TRIAC 64 at a predetermined rate to increase the speed of the motor 66 until the desired speed value is attained. More specifically, each half cycle the actual motor speed, as determined from the speed signal output of the speed sensor 58, is compared by the microcomputer 50 to the desired speed value and a "speed error" calculated. The microcomputer 50 then continues to gradually advance the firing angle of the TRIAC 64 until the actual speed exceeds the desired speed.

In the preferred embodiment, the predetermined rate at which the firing angle of the TRIAC 64 is advanced is set at 40 μsec/8.33 msec. The purpose of the gradual speed buildup is to prevent the generation of a reaction torque which can result from an abrupt change in power. A controlled gradual speed buildup is implemented whenever a faster speed is desired. If a slower speed is requested, the microcomputer 50 will effectively disable the phase control circuit 65 and permit the motor 66 to coast down to the desired speed level.

Figures 6A, 6B:
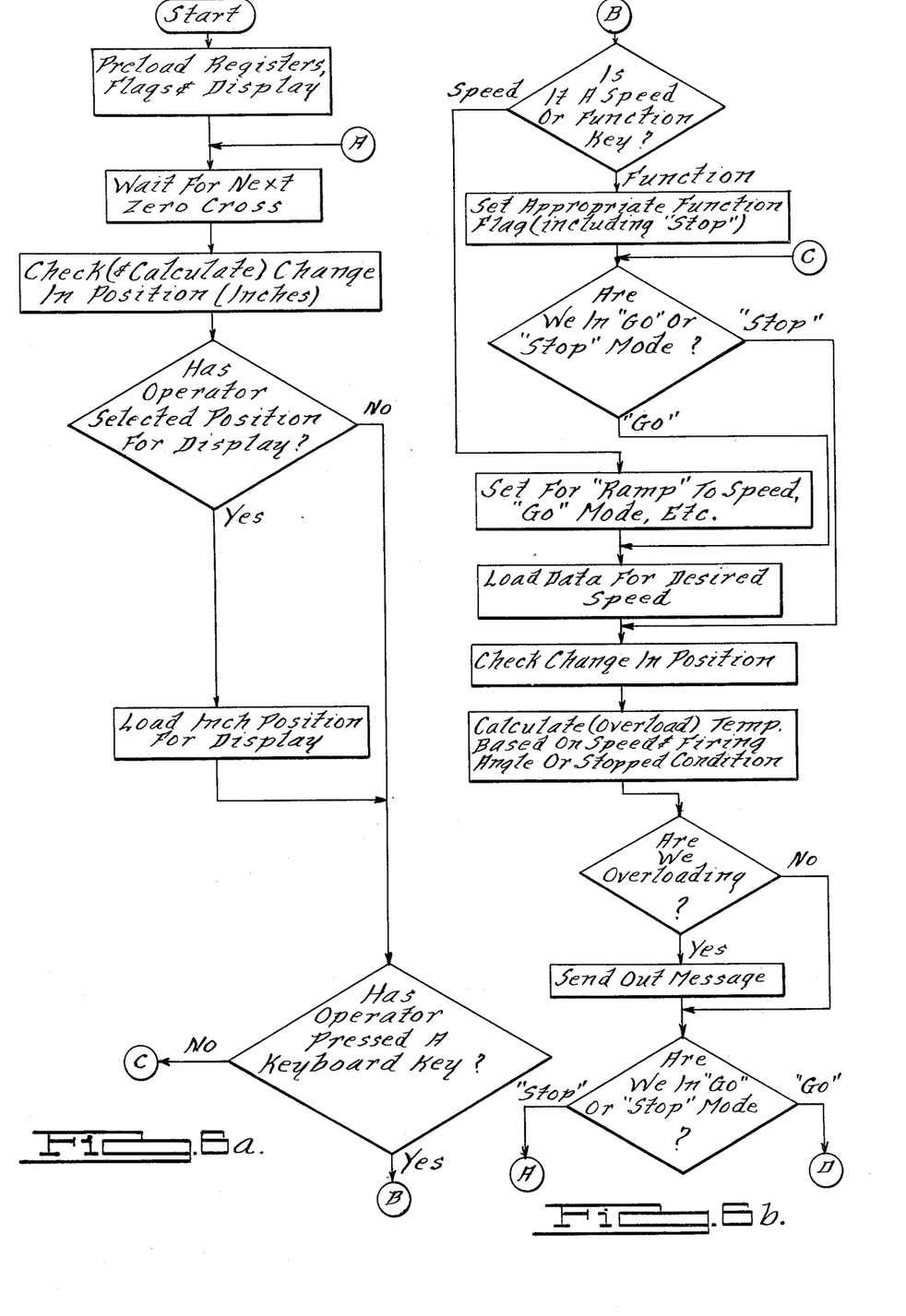
FIGS. 6a–6d illustrates the flow chart diagrams outlining the software for the microcomputer utilized in the preferred embodiment of the present invention.
Figure 6C:
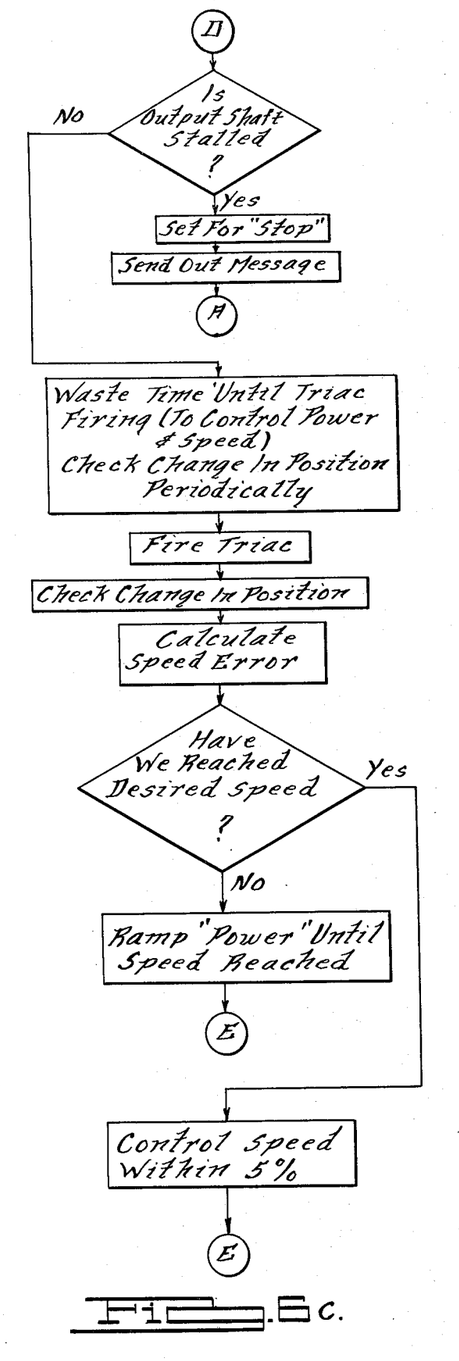

As noted in the flow chart diagram in FIG. 6c, once the desired speed has been attained, the microcomputer 50 is programmed to continue to monitor the actual speed of the motor 66 and maintain it within 5% of the desired speed value, up to full conduction of the TRIAC 64. Thus, for example, if the speed of the motor subsequently begins to decline due to an increased loading of the tool bit, the microcomputer 50 will automatically advance the firing angle of the TRIAC 64 to increase the power supplied to the motor 66 to maintain the desired speed level.

Figure 6D:
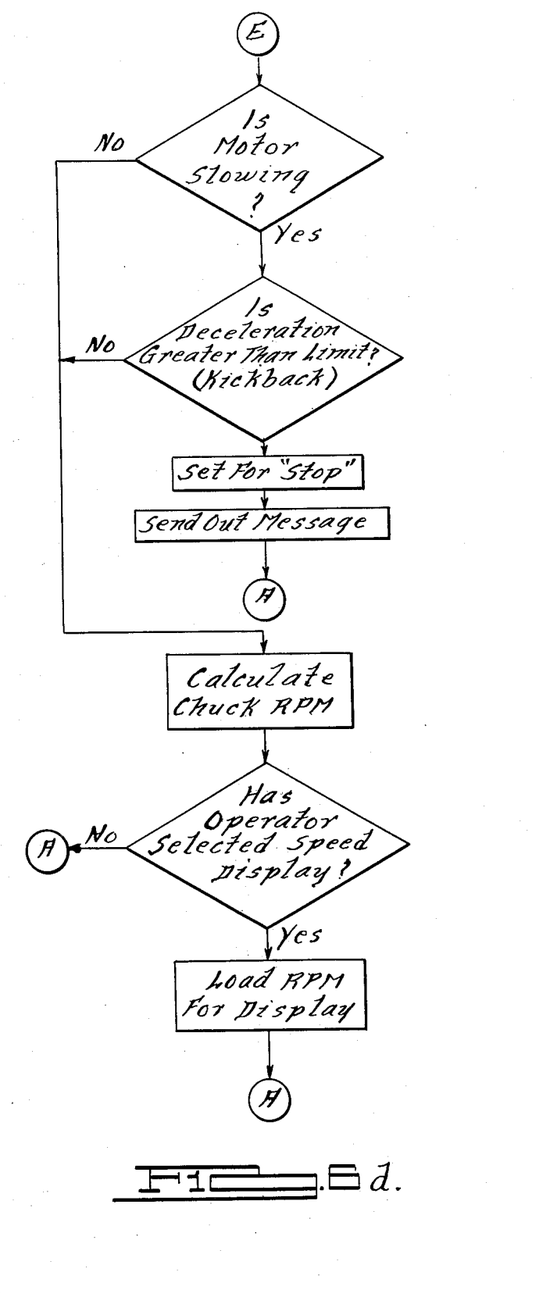

Under certain circumstances, however, the rotational speed of the chuck 20 will continue to decelerate despite an increase in power to the motor 66. This occurs when the tool bit is beginning to bind up in a workpiece. Under such circumstances, if the motor is allowed to rapidly decelerate to a stall under load, it can cause an abrupt torque reaction or "kickback". In order to prevent this from occurring, the microcomputer 50 is additionally programmed, as shown in FIG. 6d, to detect an imminent "kickback" condition and in response to the detection of such an occurrence, shut off power to the motor 66. Specifically, in connection with its control of motor speed, the microcomputer 50 is also programmed to monitor actual motor speed and detect whenever the motor is decelerating. If the rate of deceleration exceeds a predetermined limit, which in the preferred embodiment is established as a 20% change in speed within a 8.3 msec. period, then the "STOP" mode is entered, power to the motor is immediately shut off, and a "kickback" warning is displayed on the digital display 30.

In addition, if the operator subsequently attempts to re-start the motor and the tool bit does not break free within a half second period, then as indicated in FIG. 6c the microcomputer 50 will detect that the motor output shaft is stalled and again shut off power. In other words, the microcomputer 50 is also programmed to detect a lack of movement in the motor output shaft for a predefined time period, herein a half of a second, and respond by removing power to the motor. More specifically, each time a speed pulse is received at the external interrupt terminal (INT) of the microcomputer 50, a "flag" within the microcomputer is set. The microcomputer 50 checks the status of this flag once during each pass through the main program which takes approximately 8.33 msec. If the flag is not set, indicating that a speed pulse has not been received within the last 8.33 msec., then the contents of a scratchpad register or "stall counter" within the microcomputer 50 are incremented. If the flag is set when checked by the microcomputer 50, the scratchpad register is reset to zero and the flag is cleared. If the count in the scratchpad register is permitted to exceed a predetermined limit, herein a count of 60 where 60×8.33 msec.=0.5 sec., then the microcomputer 50 is programmed to shut off power to the motor 66 by discontinuing the production of TRIAC firing pulses on line 70.

This stall recognition capability also serves the dual purpose of a lost speed sensor monitor. In particular, if the speed sensor 58 fails and ceases to produce a speed signal, rather than erroneously responding by advancing the firing angle of the TRIAC 64 in an attempt to increase the "actual" motor speed to the desired speed level, the microcomputer 50 will interpret the lack of a speed signal as a stall condition and accordingly shut off power. A "stall" warning code is also displayed on the digital display 30 whenever a stall condition is detected.

Figure 5:
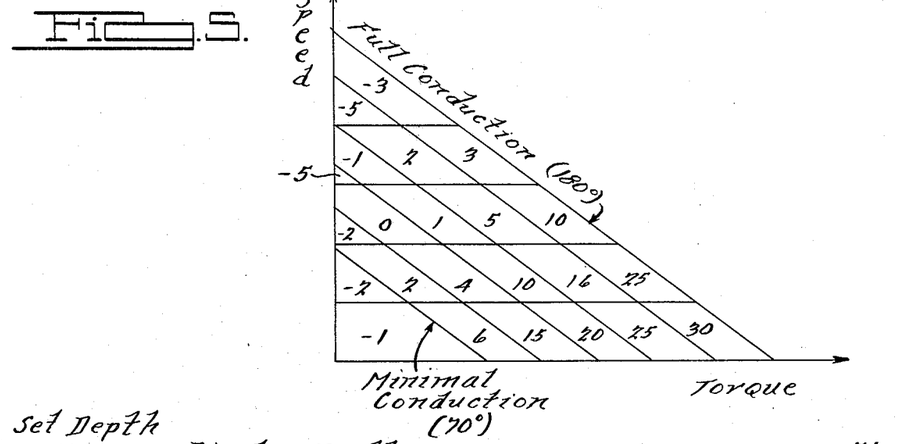
FIG. 5 is a graph of the speed vs. torque curves for the drill press motor illustrating the "heating values" assigned to the various operating ranges of the motor.

Turning now to FIG. 5, the overload protection feature of the present invention will now be explained. Some prior art attempts to provide a power tool with overload protection involve the use of a temperature sensing device which senses when the temperature of the motor reaches a critical level. The reason for not following this approach in the present invention is the incremental cost and complexity involved in adding a temperature sensor, such as a thermistor, to the unit. Instead, the present invention proceeds on the premise that the temperature of the motor can be inferred from information already available to the microcomputer; i.e., the speed of the motor and the power applied to the motor. More specifically, the factors which control the temperature of the motor are the current drawn by the motor and the means provided for dissipating the heat generated by the motor. In most power tools, a cooling fan is provided which is driven directly off the armature of the motor. Accordingly, under such circumstances, the cooling effect contributed by the fan can be determined directly from the measured speed of the motor. In addition, the current drawn by the motor can be determined from the speed of the motor and the conduction angle of the TRIAC 64. Thus, it can be seen that the information necessary to infer the operating temperature of the motor is already available to the microcomputer.

In view of the known relationship between current and temperature, many prior art motor control circuits simply establish a maximum current level for determining an overload condition. The disadvantage with this approach, however, is that it fails to recognize that it is not solely the instantaneous current draw of the motor which determines whether or not it will overload. Not only are the effects of cooling not accounted for in this approach, but also there is no recognition of the time factor involved. Cooling effects momentarily aside, a change in current does not immediately invoke a corresponding change in motor temperature. Rather, the temperature of the motor will at any given point in time, depend upon the amount of current being drawn and the period over which such current has been drawn. In other words, temperature is governed not only by present operating conditions, but past operating conditions as well. Thus, for example, a motor can safely be operated at current levels which will ultimately cause an overload condition as long as the period of operation at such levels is limited accordingly. Moreover, the period of safe operation will vary inversely with the magnitude of the current drawn by the motor and directly with the speed of the motor where a cooling fan is driven off the motor armature.

Accordingly, it is highly desirable for the control circuit to provide an overload protection scheme that is sophisticated enough to accurately distinguish between safe operating conditions and the imminent occurrence of a potentially damaging overload condition. The present invention accomplishes this by utilizing what in effect is a numerical integrator. In particular, sixty times each second an empirically determined "heating value" is added to, or subtracted from, the contents of an accumulator which herein comprises a 16-bit register. The selection of the particular "heating value" is based upon the operating speed of the motor as measured by the speed sensor 58 and the conduction angle of the TRIAC 64. If the total in the register ever exceeds a predetermined limit, an overload condition is signalled. The overload signal is removed when the total in the register drops below a second lower predetermined limit. A minor negative heating affect is assumed when the motor is not running.

In FIG. 5, the speed vs. torque curves for the motor at various conduction angles are shown. The uppermost diagonal line represents full conduction (180°) while the lowermost diagonal line represents a low conduction angle (70°). The area under the curves is divided further into five speed ranges, thereby creating a matrix. Each region in the matrix is assigned a "heating value", which is either a positive value or a negative value depending upon whether the motor experiences a net increase or decrease in temperature when operated in that region. Thus, it will be appreciated that the assigned heating values in the matrix take into account not only the degree of heat generated by the motor, but also the cooling effect caused by the airflow from the fan coupled to the motor armature. The magnitude of the number assigned to each region is determined empirically based upon the following three factors: (1) the net heating effect on the motor when continuously operated in that particular region, (2) the predetermined overload limit selected for the register, and (3) the frequency at which the contents of the register are updated. For example, in the preferred embodiment, if the motor is continuously operated in a region having a heating value of 25, an overload signal will be generated in approximately 24 seconds. Similarly, if the motor is continuously operated in a region having a heating value of 10, an overload signal will be produced after approximately one minute.

The matrix of heating values shown in FIG. 5 is stored in the microcomputer 50. Sixty times each second, the microcomputer is programmed to "look-up" the appropriate heating value, based upon the present conduction angle of the TRIAC and the measured speed of the motor, and add (subtract) the value to the contents of a 16-bit register. In the preferred embodiment, an overload signal is flashed on the digital display 30 whenever the contents of the register equal the binary equivalent of 36,096. Termination of the warning occurs when the contents of the register drop below the binary equivalent of 18,175.

In the preferred embodiment, however, power to the motor is not shut off when an overload warning is produced. This is because a motor can be briefly overloaded without permanently damaging the motor. Skilled operators of power tools knowledgable of this characteristic will at times purposefully overload a tool to briefly extract additional power from the tool. It is generally recognized by such operators that an excessive loading condition will not immediately result in damage to the motor as long as the excessive loading condition is halted before a "burning" smell is detected. Accordingly, while signalling the operator of an imminent overload condition, the present control circuit does not remove control of the drill press from the operator.

While the above description constitutes the preferred embodiment of the present invention, it will be appreciated that the invention is susceptible to modification, variation and change without departing from the proper scope or fair meaning of the accompanying claims.

What is claimed is:

1. In a drill press for cutting a workpiece including a motor drivingly coupled to a cutting implement and position control means for controlling the position of said cutting implement; the improvement comprising an electronic control circuit for controlling and monitoring the operation of the power tool including:
   a speed sensor operatively associated with said motor for monitoring the rotational speed of said motor and producing a speed signal in accordance therewith;
   a position sensor operatively associated with said position control means for sensing a relative change in the position of said cutting implement relative to a reference position and producing a position signal in accordance therewith;
   a digital display for displaying information pertaining to the operating condition of the drill press including speed information and position information;
   a keyboard for selectably determining the information to be displayed on said digital display and for establishing said reference position;
   a microcomputer interfaced with said keyboard and said digital display and programmed to calculate the rotational speed of said motor from said speed signal, calculate from said position signal the position of said cutting implement relative to said reference position, provide to said digital display the information designated via said keyboard, and monitor one or more predetermined operating parameters of said motor in accordance with information derived from said speed signal and provide predetermined code signals to said digital display for display thereon whenever one of said operating parameters exceed programmed limits; and
   said microcomputer being programmed to monitor in accordance with information derived from said speed signal the speed, rate of deceleration, and temperature of said motor, and to produce code signals upon detection of a stall condition, an imminent kickback condition and an overload condition.

2. In a drill press for drilling a workpiece including a motor drivingly coupled to a spindle having a chuck affixed thereto for receiving and securing therein a tool bit, and position control means for controlling the position of the tool bit relative to the workpiece, the improvement comprising an electronic control circuit for controlling and monitoring the operation of the drill press including:
   power circuit means including a semiconductor control device connected to said motor for controlling the application of power to said motor;
   a speed sensor operatively associated with said motor for monitoring the rotational speed of said motor and producing a speed signal in accordance therewith;
   a position sensor operatively associated with said position control means for sensing a relative change in the position of said tool bit relative to a reference position and producing a position signal in accordance therewith;

a digital display for displaying information relating to the operating condition of the drill press including speed information and position information;

input means for selectably determining the information to be displayed on said digital display, selectably determining the desired rotational speed of said motor, and for establishing said reference position;

a microcomputer interfaced with said digital display and programmed to calculate the actual speed of said motor from said speed signal, calculate from said position signal the position of said tool bit relative to said reference position, provide the designated information to said digital display, maintain the speed of said motor substantially equal to said desired speed (within the limitations of said motor) by comparing said actual speed to said desired speed and producing an appropriate control signal which is supplied to said power circuit means to adjust the power applied to said motor accordingly, and monitor one or more predetermined operating parameters associated with said motor in accordance with information derived from said speed signal and provide predetermined code signals to said digital display whenever one of said operating parameters exceed programmed limits; and said microcomputer being programmed to monitor in accordance with information derived from said speed signal the speed, rate of deceleration, and temperature of said motor, and to produce code signals upon detection of a stall condition, an imminent kickback condition and an overload condition.

3. In a drill press for drilling a workpiece including a motor drivingly coupled to a spindle having a chuck affixed thereto for receiving and securing therein a tool bit, position control means for controlling the vertical position of the tool bit relative to the workpiece, and a digital control circuit for controlling the operation of the drill press including:

power circuit means connected to said motor for controlling the application of power to said motor;

a speed sensor for sensing the rotational speed of the motor and producing a signal in accordance therewith;

input means for selectably determining the desired rotational speed of said motor;

speed control means responsive to said input means for controlling the speed of said motor by comparing said desired speed to the actual speed of said motor as determined from said speed signal and providing an appropriate output signal to said power circuit means to adjust the power applied to said motor until said actual speed substantially equals said desired speed;

parameter control means for determining, at least in part from information derived from said speed signal, the relative value of at least one predetermined operating parameter associated with said motor other than its speed and detecting whenever said value bears a predetermined relationship to a predefined limit;

said predetermined operating parameter comprises the temperature of said motor; and said predefined limit comprises an overload limit.

4. The drill press of claim 3 wherein said parameter control means is adapted to determine the temperature of said motor in accordance with said speed signal and the level of power applied by said power circuit means to said motor.

5. The drill press of claim 4 further including a digital display for displaying a visual warning signal whenever said overload limit is exceeded.

* * * * *